United States Patent
Åström et al.

(10) Patent No.: US 10,959,258 B2
(45) Date of Patent: Mar. 23, 2021

(54) TRANSMISSION ALLOCATION CONTROL

(71) Applicant: Telefonaktiebolaget LM Ericsson (publ), Stockholm (SE)

(72) Inventors: Magnus Åström, Lund (SE); Andres Reial, Malmö (SE); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/760,075

(22) PCT Filed: Jun. 22, 2017

(86) PCT No.: PCT/EP2017/065401
§ 371 (c)(1),
(2) Date: Mar. 14, 2018

(87) PCT Pub. No.: WO2018/233831
PCT Pub. Date: Dec. 27, 2018

(65) Prior Publication Data
US 2019/0053268 A1      Feb. 14, 2019

(51) Int. Cl.
*H04W 72/14* (2009.01)
*H04L 1/00* (2006.01)
*H04L 5/00* (2006.01)
*H04W 72/04* (2009.01)
*H04W 88/12* (2009.01)

(52) U.S. Cl.
CPC ............ *H04W 72/14* (2013.01); *H04L 1/00* (2013.01); *H04L 1/0003* (2013.01);
(Continued)

(58) Field of Classification Search
CPC . H04W 72/14; H04W 72/0453; H04W 88/12; H04L 1/0003; H04L 1/00;
(Continued)

(56) References Cited

U.S. PATENT DOCUMENTS 9,917,670 B1 * 3/2018 Zhang .................. H04J 11/003
2010/0197314 A1   8/2010 Maaref et al.
(Continued)

FOREIGN PATENT DOCUMENTS

WO   WO-2016038510 A1 *  3/2016 ............ H04W 72/10

OTHER PUBLICATIONS

Mitsubishi Electric, "R1-061705: Impact of scalable bandwidth and multiple camping positions on modulation parameters," Third Generation Partnership Project (3GPP) TSG RAN WG1, LTE Ad Hoc, Jul. 27-30, 2006, Cannes, France, 12 pages.
(Continued)

*Primary Examiner* — Yemane Mesfin
*Assistant Examiner* — Intekhaab A Siddiquee
(74) *Attorney, Agent, or Firm* — Withrow & Terranova, PLLC

(57) ABSTRACT

A transmission allocation method is disclosed for a network node of a wireless communication system configured to communicate using an Orthogonal Frequency Division Multiplexing (OFDM) signal comprising sub-carriers in a frequency domain and a symbols in a time domain. The network node is associated with a network node bandwidth comprising a network node direct current (DC) sub-carrier. The network node is configured to communicate with a wireless communication device (WCD) associated with a WCD bandwidth comprising a WCD DC sub-carrier which is different from the network node DC sub-carrier. The method comprises acquiring, in relation to an upcoming communication between the network node and the WCD, at least one of an indication of a receiver DC frequency and an indication of a transmitter DC frequency, determining a transmission allocation for the upcoming communication based on the acquired indication(s), and performing communication based on the transmission allocation.

26 Claims, 3 Drawing Sheets

(52) U.S. Cl.
CPC .......... *H04L 5/0041* (2013.01); *H04L 5/0064* (2013.01); *H04L 5/0094* (2013.01); *H04W 72/0453* (2013.01); *H04W 88/12* (2013.01); H04L 5/0007 (2013.01); H04L 5/0044 (2013.01)

(58) Field of Classification Search
CPC ... H04L 5/0041; H04L 5/0064; H04L 5/0094; H04L 5/0007; H04L 5/0044
USPC .......................................................... 370/329
See application file for complete search history.

(56) References Cited

U.S. PATENT DOCUMENTS

2016/0105803 A1* 4/2016 Sakhnini ............... H04L 27/265
455/45
2017/0156151 A1 6/2017 Wakabayashi
2018/0287760 A1* 10/2018 Choi ...................... H04J 11/005

OTHER PUBLICATIONS

Samsung, "R1-1706711: WF on DMRS and DC Subcarrier," Third Generation Partnership Project (3GPP) TSG RAN WG1 Meeting #88bis, Apr. 3-7, 2017, Spokane, Washington, USA, 3 pages.
Invitation to Pay Additional Fees and Partial Search for International Application No. PCT/EP2017/065401, dated Mar. 19, 2018, 21 pages.

* cited by examiner

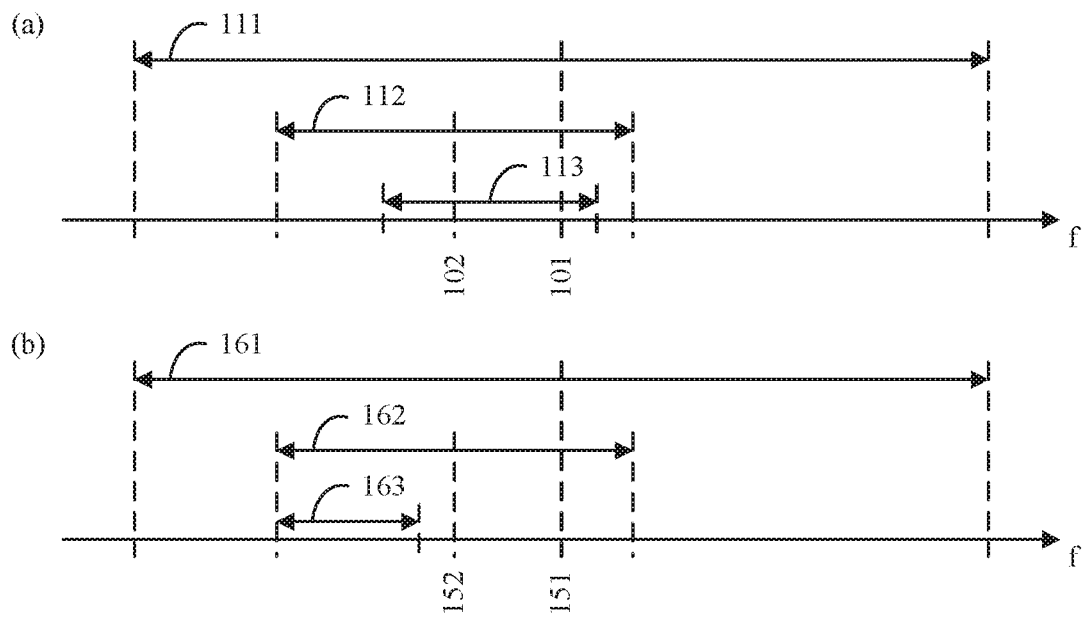
FIG. 1
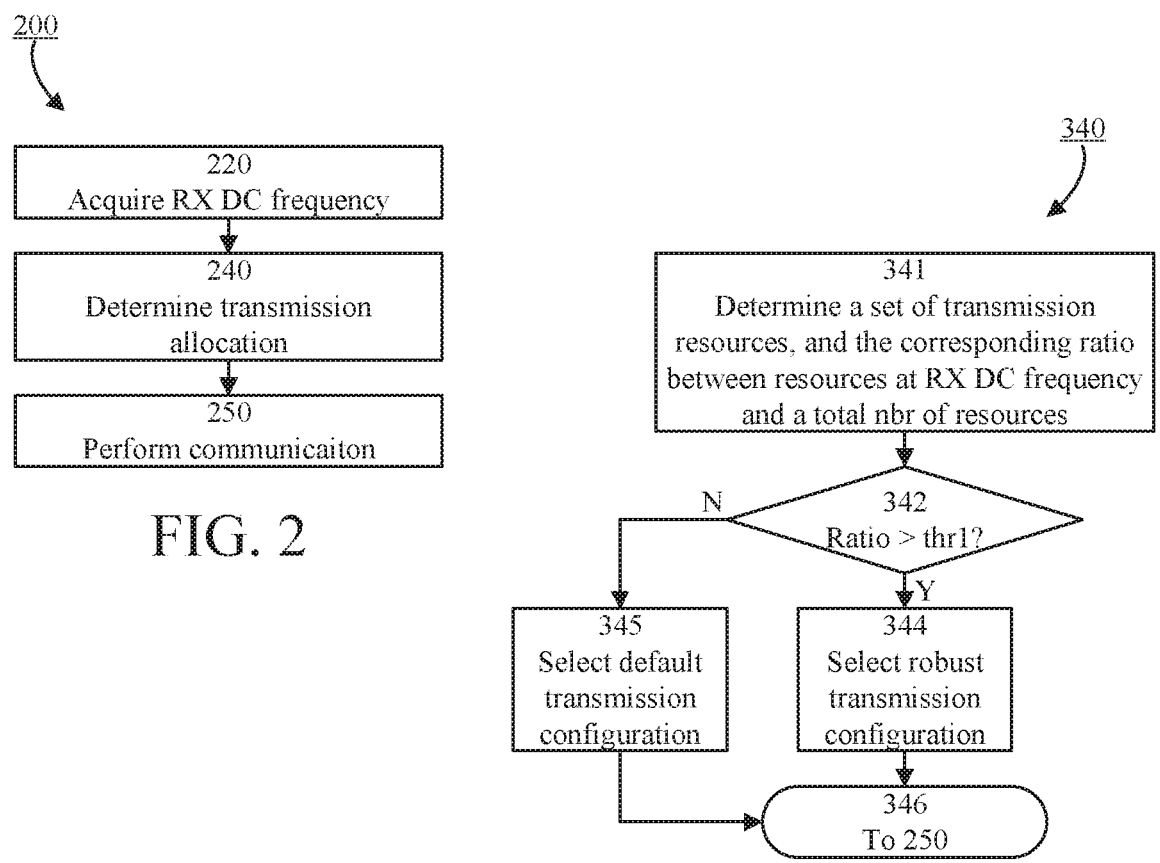
FIG. 2
FIG. 3

TRANSMISSION ALLOCATION CONTROL

This application is a 35 U.S.C. § 371 national phase filing of International Application No. PCT/EP2017/065401, filed Jun. 22, 2017, the disclosure of which is incorporated herein by reference in its entirety.

TECHNICAL FIELD

The present disclosure relates generally to the field of wireless communication. More particularly, it relates to transmission allocation in wireless communication systems using Orthogonal Frequency Division Multiplexing (OFDM).

BACKGROUND

In OFDM, information is distributed on sub-carriers spread out along the transmission bandwidth (BW). By mathematical manipulation, the sub-carriers will appear to be orthogonal to each other, implying that one sub-carrier does not interfere with another. The sub-carriers in OFDM are typically represented in a baseband representation as ranging from a frequency equal to −BW/2 to a frequency equal to +BW/2, and one sub-carrier is typically defined at the zero frequency point of the baseband representation. When the baseband representation is up-converted to the carrier frequency of the OFDM communication, the frequency where the zero frequency point of the baseband representation ends up is termed the direct current (DC) frequency herein.

Imperfections that affect the DC frequency sub-carrier in the form of DC noise may be present in an OFDM transmitter (e.g. in the form of direct local oscillator (LO) leakage and/or a frequency offset in the baseband representation used to modulate the LO frequency) and/or in an OFDM receiver (e.g. in the form of analog DC imperfections that may occur in down-conversion and filtering processes).

The sub-carrier at the DC frequency, in which the DC noise presents itself, is orthogonal to the remaining sub-carriers. Hence, the DC noise does not affect the other sub-carriers.

Furthermore, the DC noise may to some degree be mitigated in the baseband. However, information that was transmitted on the DC sub-carrier may be severely affected by the DC noise and/or by the DC noise mitigation and may become indistinguishable from the DC sub-carrier noise at the OFDM receiver.

In Long Term Evolution (LTE)—a concept advocated by the Third Generation Partnership Project (3GPP)—a User Equipment (UE) is assumed to either cover the whole carrier bandwidth or (for UE:s which only support a bandwidth lower than the carrier bandwidth) is assumed to have its communication signals centered in the carrier bandwidth. In the downlink (DL), the DC sub-carrier is omitted from transmission. Since the DC sub-carrier consequently does not contain any information, it may simply be discarded at the OFDM receiver.

New Radio (NR) is a wireless communication concept developed to, inter alia, provide more flexible solutions than LTE. NR is designed to suit a wide variety of communication needs; e.g. wideband enhanced mobile broadband (eMBB), ultra-reliable low latency communications (URLLC), and narrowband massive machine type communications (mMTC) for the Internet of things (IoT). One approach to provide suitability for such varying needs is to allocate UE:s to different parts of the network spectrum (comprising one or more network bandwidths). For example, one eMBB UE may be allocated a wideband part of the network spectrum, an IoT device may only be capable of covering a small sub-band part of the network spectrum, and an URLLC device may be allocated a separate network bandwidth due to its very specific needs.

As a consequence of the flexibility of NR, the position of the DC frequency may differ between different devices connected to a network, and some or all of these positions may differ from the DC frequency of the network node. Furthermore, a frequency range scheduled for communication of data (allocated sub-carriers) during a certain communication to a UE may either coincide with the position of the DC frequency of the UE or not. Two examples of such scenarios are illustrated in FIG. 1.

FIG. 1(a) shows a position of the network DC frequency 101 which is centered in the network bandwidth 111, a position of the a UE DC frequency 102 which is centered in the UE bandwidth 112, and a scheduled frequency range 113. In the example of FIG. 1(a), the network DC frequency 101 differs from the UE DC frequency 102, the scheduled frequency range 113 comprises both the network DC frequency 101 and the UE DC frequency 102, and neither the network DC frequency 101 nor the UE DC frequency 102 is centered in the scheduled frequency range 113.

FIG. 1(b) shows a position of the network DC frequency 151 which is centered in the network bandwidth 161, a position of the a UE DC frequency 152 which is centered in the UE bandwidth 162, and a scheduled (allocated) frequency range 163. In the example of FIG. 1(b), the network DC frequency 151 differs from the UE DC frequency 152, and the scheduled frequency range 163 comprises neither the network DC frequency 151 nor the UE DC frequency 152.

The flexible frequency allocation for UE:s in NR leads to that a fixed DC sub-carrier cannot be defined that would apply to all UE:s (and the network node). Therefore, the solution to the problem of DC noise used in LTE (i.e. that the DC sub-carrier is omitted from transmission) is not applicable to NR, and NR defines that all sub-carriers of an allocation are used to convey data. Therefore, impaired receiver performance may be expected when the DC frequency of the receiver and/or the transmitter is included in the scheduled frequency range (compare with FIG. 1(a)).

Therefore, there is a need for approaches that decrease the impact of DC noise in such situations.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

According to a first aspect, this is achieved by a transmission allocation method for a network node of a wireless communication system configured to communicate using an Orthogonal Frequency Division Multiplexing (OFDM) signal comprising a plurality of sub-carriers in a frequency domain and a plurality of symbols in a time domain.

The network node is associated with a network node bandwidth comprising a network node direct current (DC) sub-carrier, and the network node is configured to communicate with a wireless communication device (WCD) associated with a WCD bandwidth comprising a WCD DC sub-carrier which is different from the network node DC sub-carrier. Each DC sub-carrier is one of the plurality of sub-carriers.

The method comprises (for an upcoming communication between the network node and the WCD) acquiring, in relation to the upcoming communication, at least one of an indication of a receiver DC frequency and an indication of a transmitter DC frequency.

The method also comprises (for the upcoming communication) determining, based on at least one of the receiver DC frequency and the transmitter DC frequency, a transmission allocation for the upcoming communication. The transmission allocation comprises a set of transmission resources and a transmission configuration, and the set of transmission resources comprises a set of allocated sub-carriers of the plurality of sub-carriers and a set of allocated symbols of the plurality of symbols.

The method also comprises performing communication based on the transmission allocation.

In some embodiments, determining the transmission allocation based on the receiver DC frequency may comprise:
  determining the set of transmission resources as non-overlapping with the receiver DC frequency, and the transmission configuration as having a default modulation and coding scheme and a default estimated performance metric, or
  determining the set of transmission resources as overlapping with the receiver DC frequency and one or more of:
    depleting transmission resources at the receiver DC frequency,
    determining the set of transmission resources as having a first ratio between a number of transmission resources at the receiver DC frequency and a total number of transmission resources that falls below a ratio threshold and the transmission configuration as having a first modulation and coding scheme and a first estimated performance metric, and
    determining the transmission resources as having a second ratio between the number of transmission resources at the receiver DC frequency and the total number of transmission resources that falls above the ratio threshold, and the transmission configuration as having a second modulation and coding scheme and a second estimated performance metric.

The first, second and default modulation and coding schemes and the first, second and default estimated performance metrics may, according to some embodiments, be compliant with at least one of:
  the second modulation and coding scheme being more robust than the first modulation and coding scheme,
  a second performance margin associated with the second estimated performance metric being larger than a first performance margin associated with the first estimated performance metric,
  the second modulation and coding scheme being more robust than the default modulation and coding scheme,
  the second performance margin associated with the second estimated performance metric being larger than a default performance margin associated with the first estimated performance metric,
  the first modulation and coding scheme being more robust than the default modulation and coding scheme, and
  the first performance margin associated with the first estimated performance metric being larger than the default performance margin associated with the first estimated performance metric.

In some embodiments, the upcoming communication is a downlink communication and the receiver DC frequency corresponds to the WCD DC sub-carrier. Acquiring the indication of the receiver DC frequency in relation to the upcoming communication may comprise one or more of: receiving the indication from the WCD and determining the indication by estimating the receiver DC frequency as a center frequency of the WCD bandwidth. Performing communication based on the transmission allocation may comprise transmitting the OFDM signal of the upcoming communication according to the transmission allocation.

In some embodiments, the upcoming communication is an uplink communication and the receiver DC frequency corresponds to the network node DC sub-carrier. Acquiring the indication of the receiver DC frequency in relation to the upcoming communication may comprise retrieving the receiver DC frequency from bandwidth registering circuitry of the network node. Performing communication based on the transmission allocation may comprise transmitting a scheduling grant for the upcoming communication, the scheduling grant being indicative of the transmission allocation. The method may further comprise receiving the OFDM signal of the upcoming communication from the WCD, the OFDM signal being transmitted by the WCD according to the transmission allocation. When a first part of the OFDM signal is received in transmission resources at the receiver DC frequency and a second part of the OFDM signal is received in other transmission resources, the method may further comprise applying less weight to the first part of the OFDM signal than to the second part of the OFDM signal.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is a transmission allocation arrangement for a network node of a wireless communication system configured to communicate using an Orthogonal Frequency Division Multiplexing (OFDM) signal comprising a plurality of sub-carriers in a frequency domain and a plurality of symbols in a time domain.

The network node is associated with a network node bandwidth comprising a network node direct current (DC) sub-carrier, and the network node is configured to communicate with a wireless communication device (WCD) associated with a WCD bandwidth comprising a WCD DC sub-carrier which is different from the network node DC sub-carrier. Each DC sub-carrier is one of the plurality of sub-carriers.

The arrangement comprises a controller configured to cause (for an upcoming communication between the network node and the WCD)
  acquisition, in relation to the upcoming communication, of at least one of an indication of a receiver DC frequency and an indication of a transmitter DC frequency,
  determination, based on at least one of the receiver DC frequency and the transmitter DC frequency, of a transmission allocation for the upcoming communication, the transmission allocation comprising a set of transmission resources and a transmission configuration, and the set of transmission resources comprising a set of allocated sub-carriers of the plurality of sub-carriers and a set of allocated symbols of the plurality of symbols, and performance of communication based on the transmission allocation.

A fourth aspect is a transmission allocation arrangement for a network node of a wireless communication system configured to communicate using an Orthogonal Frequency Division Multiplexing (OFDM) signal comprising a plurality of sub-carriers in a frequency domain and a plurality of symbols in a time domain.

The network node is associated with a network node bandwidth comprising a network node direct current (DC) sub-carrier, and the network node is configured to communicate with a wireless communication device (WCD) associated with a WCD bandwidth comprising a WCD DC sub-carrier which is different from the network node DC sub-carrier. Each DC sub-carrier is one of the plurality of sub-carriers.

The arrangement comprises acquiring circuitry (e.g. an acquirer or an acquiring module) configured to acquire, in relation to an upcoming communication between the network node and the WCD, at least one of an indication of a receiver DC frequency and an indication of a transmitter DC frequency.

The arrangement also comprises determination circuitry (e.g. a determiner or a determination module) configured to determine, based on at least one of the receiver DC frequency and the transmitter DC frequency, a transmission allocation for the upcoming communication, the transmission allocation comprising a set of transmission resources and a transmission configuration, and the set of transmission resources comprising a set of allocated sub-carriers of the plurality of sub-carriers and a set of allocated symbols of the plurality of symbols.

The arrangement also comprises transceiving circuitry (e.g. a transceiver or a transceiving module) configured to perform communication based on the transmission allocation.

A fifth aspect is a network node comprising the arrangement of any of the third or fourth aspect.

In some embodiments, any of the above aspects may additionally have features identical with or corresponding to any of the various features as explained above for any of the other aspects.

An advantage of some embodiments is that approaches are provided that enable decreasing of the impact of DC noise in situations when the DC frequency (i.e. the DC sub-carrier) of the receiver and/or the transmitter is included in the scheduled (i.e. allocated) frequency range. For uplink (UL) communication, the transmitter is in the WCD and the receiver is in the network node. For downlink (DL) communication, the transmitter is in the network node and the receiver is in the WCD.

Another advantage of some embodiments is that a more accurate and efficient scheduling may be achieved, that also takes into consideration the effects of low modulation quality of transmission resources on the DC sub-carrier.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 1 is a schematic drawing illustrating two frequency domain scenarios (a) and (b) according to some embodiments;

FIG. 2 is a flowchart illustrating example method steps according to some embodiments;

FIG. 3 is a flowchart illustrating example method steps according to some embodiments;

DETAILED DESCRIPTION

Figure 4:
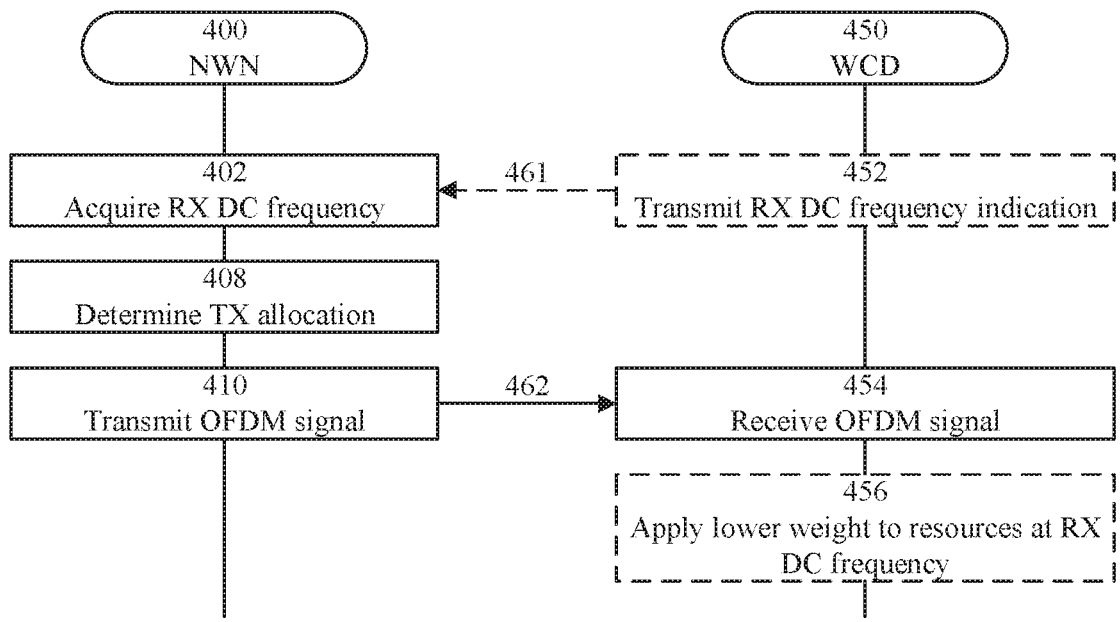
FIG. 4 is a combined flowchart and signaling diagram illustrating example method steps and signaling according to some embodiments.

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where approaches are provided that enable decreasing of the impact of DC noise in situations when the DC sub-carrier of the receiver and/or the transmitter is included in the allocated frequency range.

FIG. 2 illustrates steps of an example method 200 according to some embodiments. The method 200 is a transmission allocation method for a network node of a wireless communication system, the network node being configured to communicate with a wireless communication device (WCD, e.g. a UE). The wireless communication system is configured to communicate using an OFDM signal comprising a plurality of sub-carriers in a frequency domain and a plurality of symbols in a time domain.

The example method 200 is particularly beneficial when a network node DC sub-carrier (101 and 151 of FIG. 1) comprised in the network node bandwidth (111 and 161 of FIG. 1) differs from a WCD DC sub-carrier (102 and 152 of FIG. 1) comprised in the WCD bandwidth (112 and 162 of FIG. 1).

The method 200 starts in step 220 where an indication of a receiver (RX) DC frequency is acquired in relation to an upcoming communication between the network node and the WCD. Generally, acquisition and further use of the receiver DC frequency will be used herein to exemplify various embodiments. However, an indication of a transmitter (TX) DC frequency may be acquired and used in addition to, or alternatively to, the indication of the receiver DC frequency.

Step 220 may be performed less often than the following steps of the method 200 according to some embodiments. This is particularly applicable when the network node bandwidth and the WCD bandwidth are fixed. Alternatively, step 220 may be performed in connection with each execution of the following steps of the method 200.

In step 240, a transmission allocation for the upcoming communication is determined based on the receiver DC frequency (and/or based on the transmitter DC frequency as applicable). Communication is then performed in step 250 based on the transmission allocation.

When the transmitter is the network node and the transmitter DC frequency includes reference signals, the network node may take into account a reduced channel estimate quality (due to transmission over transmitter DC frequency) when assessing receiver performance.

A transmission allocation is specified herein to comprise a set of transmission resources and a transmission configuration. The set of transmission resources comprises a set of allocated sub-carriers of the plurality of sub-carriers and a set of allocated symbols of the plurality of symbols. Typically, the set of transmission resources may be a matrix of time resources (symbols) and frequency resources (sub-carriers), e.g. a set of resource elements (RE:s), a set of resource blocks (RB:s) or a set of resource units (RU:s). The transmission configuration may, for example, specify one or more of a modulation and coding scheme, a transmission power, a code rate, a transmission rank, and other relevant transmission parameters.

Some considerations that may be used in the implementation of step 240 will now be exemplified.

In order to mitigate the performance decrease experienced when using transmission resources at the DC frequency, the transmission allocation (scheduling) may consider a decreased data allocation for unchanged RB allocation, thereby allowing allocation of a lower-rate modulation and coding scheme (MCS). One way to accomplish this is to assume that all DC RE:s are punctured in the receiver and to adjust the MCS accordingly so that the original desired MCS is effectively obtained after puncturing.

Alternatively or additionally, mitigation may comprise increasing the number of scheduled RE:s or RB:s such that the allocated data is transmitted with a lower MCS but the original desired MCS is obtained after puncturing. In this case, the data allocation for the transmission remains unchanged, at the cost of somewhat higher RB usage.

Alternatively or additionally, mitigation may be provided by scheduling around a DC sub-carrier, i.e. excluding the DC subcarrier from the available RE set. This may be particularly efficient if multiple UE:s have different bandwidth configurations and DC sub-carrier positions. Such a scheduling can imply non-contiguous scheduling allocation. However, both NR UL and DL use OFDM where non-contiguous scheduling assignments are feasible.

A change in MCS and/or bandwidth allocation also implies changing the PDCCH content related to distribution of MCS and/or scheduling bandwidth information both for the DL and U L.

FIG. 3 illustrates an example method 340 that may be used to determine the transmission allocation in step 240 of FIG. 2.

The method 340 starts in step 341 where the set of transmission resources is determined. A corresponding ratio, between resources at the receiver DC frequency and the total number of resources of the set, is also determined.

If the ratio is not larger than a first threshold value (thr1), N-path out from step 342, a default transmission configuration is selected as indicated by step 345. If the ratio is larger than the first threshold value, Y-path out from step 342, a transmission configuration that is more robust than the default transmission configuration is selected as indicated by step 344. Then, the method 340 is completed and step 250 of FIG. 2 may be executed as indicated by step 346.

The first threshold value (thr1) may be a ratio threshold having a value between 0 and 1. A typical value may be 0.1, for example.

In step 341, the set of transmission resources may be determined as non-overlapping with the receiver DC frequency. This effectively achieves a scheduling around of the receiver DC frequency to avoid any problems connected with transmissions using the receiver DC frequency sub-carrier. In this case the ratio becomes zero and the default transmission configuration (i.e. a default modulation and coding scheme and a default estimated performance metric) is selected in step 345.

Alternatively, the set of transmission resources may be determined in step 341 as overlapping with the receiver DC frequency. In this case the ratio becomes larger than zero.

If this ratio is not larger than the first threshold value, the selected transmission configuration may be termed the first transmission configuration. According to FIG. 3, the default transmission configuration is selected in step 345 as the first transmission configuration. In some embodiments not illustrated in FIG. 3, the first transmission configuration is not the same as the default transmission configuration. In this alternative, the first transmission configuration may be more robust than the default transmission configuration and less robust than the second transmission configuration which is introduced in the following.

If this ratio is larger than the first threshold value, the selected transmission configuration may be termed the second transmission configuration. According to FIG. 3, the more robust transmission configuration is selected in step 344 as the second transmission configuration.

Each selected transmission configuration (default, robust, first, second) may be associated with a corresponding estimated performance metric associated with a corresponding performance margin. The estimated performance metric may, for example, comprise a signal-to-interference-ratio (SIR) or similar metric and the performance margin may be expressed as an excess SIR. If one transmission configuration is more robust than another transmission configuration, the performance margin of the one transmission configuration is larger than the performance margin of the other transmission configuration.

The selection of transmission configuration (steps 344, 345) may comprise selecting modulation and coding scheme and/or other transmission parameters.

Robustness of a modulation and coding scheme (MCS) is typically evident from its position in a MCS table provided in wireless communications standards. Selecting a suitable MCS is in itself based on a threshold comparison according to wireless communications standards. This MCS threshold could be adjusted depending on the ratio determined in step 341 to arrive at a MCS with suitable robustness.

Additionally or alternatively, robustness may be determined via the performance margins as exemplified above. For example, assuming that a known amount of the signal energy for the DC sub-carrier is lost, the signal power level may be adjusted accordingly in the SIR calculation used in the selection of MCS.

Alternatively or additionally to the selection of the more robust transmission configuration of step 344, a depletion of the transmission resources at the receiver DC frequency may be applied. The term depletion is meant to encompass any operation that results in that these transmission resources are effectively not used. Depletion may, for example, comprise one or more of setting the transmission power to zero for the sub-carrier at the receiver DC frequency, adjusting the rate matching to exclude mapping of data to the sub-carrier at the receiver DC frequency, and simply not allocating data to the sub-carrier at the receiver DC frequency.

FIG. 4 is a combined flowchart and signaling diagram illustrating example method steps and signaling between a network node (NWN) 400 and a WCD 450 when the upcoming communication is a downlink communication and the receiver DC frequency corresponds to the WCD DC sub-carrier.

The NWN acquires the indication of the receiver DC frequency in step 402 (compare with step 220 of FIG. 2). The acquisition of step 402 may comprise receiving the indication from the WCD as illustrated by 461 (in which case the WCD has transmitted the indication in step 452). Alternatively or additionally, the acquisition of step 402 may comprise determining the indication by estimating the receiver DC frequency as a center frequency of the WCD bandwidth.

The NWN determines a transmission allocation based on the receiver DC frequency in step 408 (compare with step 240 of FIG. 2 and method 340 of FIG. 3).

In step 410, the NWN performs communication based on the transmission allocation (compare with step 250 of FIG. 2), which in the downlink case comprises transmitting the OFDM signal 462 of the upcoming communication according to the transmission allocation.

The OFDM signal is received by the WCD in step 454 and the WCD may, as indicated by optional step 456, apply a lower weight to resources at the receiver DC frequency in its processing of the received signal.

Thus, when a first part of the OFDM signal is received in transmission resources at the receiver DC frequency and a second part of the OFDM signal is received in other transmission resources, step 456 comprises applying less weight to the first part of the OFDM signal than to the second part of the OFDM signal.

Application of lower/less weight may, for example, be implemented by completely discarding content of the resources at the receiver DC frequency (puncturing; weight equals zero), or by, in a decoding process, scaling soft values associated with such resources with a number between zero and one.

Alternatively or additionally, time domain filtering may be applied to achieve application of lower/less weight. OFDM processing is a type of filter bank in itself which may be used to estimate parameters of the DC component by filtering over several symbols. Optionally, such information may be fed back to the transmitter in the downlink case and to the UL scheduler in the uplink case.

Figure 5:
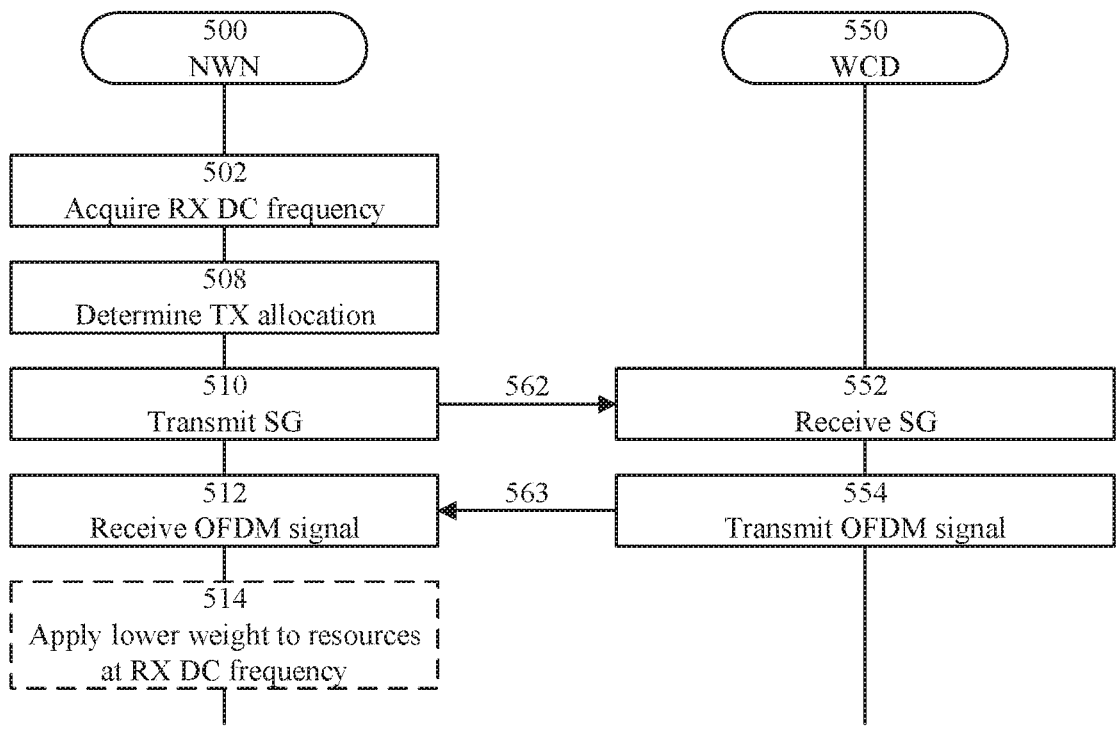
FIG. 5 is a combined flowchart and signaling diagram illustrating example method steps and signaling according to some embodiments.

FIG. 5 is a combined flowchart and signaling diagram illustrating example method steps and signaling between a network node (NWN) 500 and a WCD 550 when the upcoming communication is an uplink communication and the receiver DC frequency corresponds to the network node DC sub-carrier.

The NWN acquires the indication of the receiver DC frequency in step 502 (compare with step 220 of FIG. 2). The acquisition of step 502 may comprise retrieving the receiver DC frequency from bandwidth register circuitry of the network node.

The NWN determines a transmission allocation based on the receiver DC frequency in step 508 (compare with step 240 of FIG. 2, method 340 of FIG. 3 and step 408 of FIG. 4).

In step 510, the NWN performs communication based on the transmission allocation (compare with step 250 of FIG. 2), which in the uplink case comprises transmitting a scheduling grant (SG) 562 for the upcoming communication, the scheduling grant being indicative of the transmission allocation.

The scheduling grant is received by the WCD in step 552 and, in step 554, the WCD transmits the OFDM signal 563 of the upcoming communication according to the transmission allocation.

The OFDM signal is received by the NWN in step 512 and the NWN may, as indicated by optional step 514, apply a lower weight to resources at the receiver DC frequency in its processing of the received signal (compare with step 456 of FIG. 4 and details described in connection thereto).

Figure 6:
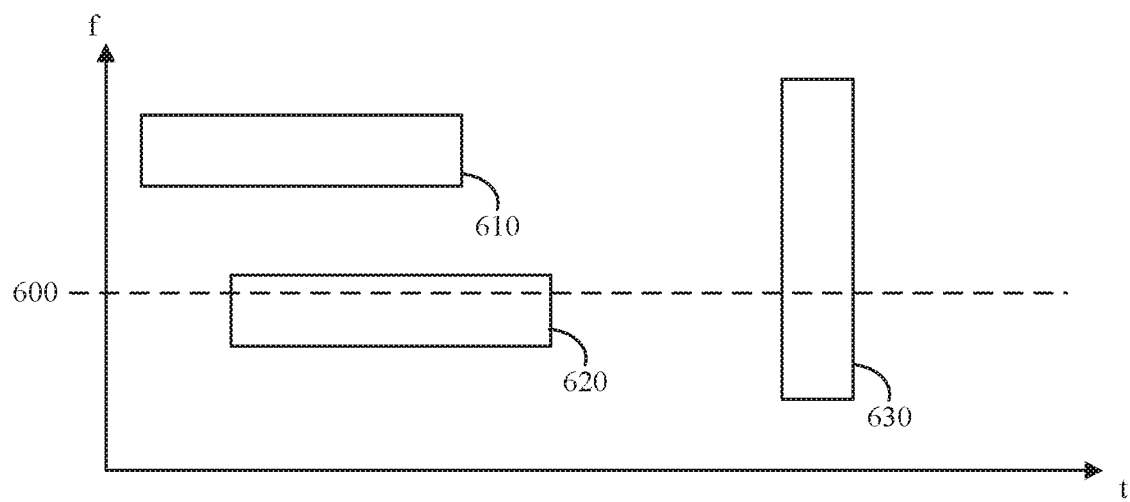
FIG. 6 is a schematic drawing illustrating time/frequency domain scenarios according to some embodiments.

FIG. 6 is a schematic drawing illustrating some example time/frequency domain scenarios in relation to a receiver DC frequency 600. In the first scenario, the set of transmission resources 610 is determined as non-overlapping with the receiver DC frequency. In the second and third scenarios, the set of transmission resources 620 and 630, respectively, are determined as overlapping with the receiver DC frequency. The ratio, between resources the receiver DC frequency and the total number of resources of the set, is larger for the set 620 than for the set 630. Consequently, one typical approach might be to select respective transmission configurations for these three sets such that the set 620 has a transmission configuration that is more robust than that of the set 630, and such that the set 630 has a transmission configuration that is more robust than that of the set 610.

Figure 7:
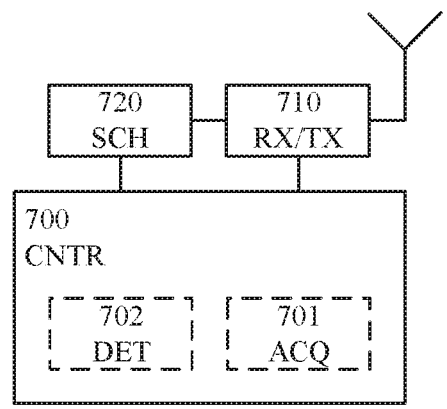
FIG. 7 is a schematic block diagram illustrating an example arrangement according to some embodiments.

FIG. 7 schematically illustrates an example arrangement according to some embodiments. The arrangement is a transmission allocation arrangement for a network node of a wireless communication system configured to communicate using an OFDM signal comprising a plurality of sub-carriers in a frequency domain and a plurality of symbols in a time domain.

The network node is associated with a network node bandwidth comprising a network node DC sub-carrier, and the network node is configured to communicate with a WCD associated with a WCD bandwidth comprising a WCD DC sub-carrier which is different from the network node DC sub-carrier. Each DC sub-carrier is one of the plurality of sub-carriers.

The example arrangement comprises a controller (CNTR) 700, and may also comprise a transceiving circuitry (RX/TX; e.g. a transceiver or a transceiving module) 710 and a scheduler (SCH) 720. Comprised in, or otherwise associated with, the controller, there may also be acquiring circuitry (ACQ; e.g. an acquirer or an acquiring module) 701 and determination circuitry (DET; e.g. a determiner or a determination module) 702.

The arrangement of FIG. 7 may be configured to cause (e.g. perform) method steps according to any of the FIGS. 2-5 as described above.

Thus, in some embodiments, the controller is configured to cause (for an upcoming communication between the network node and the WCD):

acquisition (by the acquiring circuitry), in relation to the upcoming communication, of at least one of an indication of a receiver DC frequency and an indication of a transmitter DC frequency, determination (by the determining circuitry), based on at least one of the receiver DC frequency and the transmitter DC frequency, of a transmission allocation for the upcoming communication, the transmission allocation comprising a set of transmission resources and a transmission configuration, and the set of transmission resources comprising a set of allocated sub-carriers of the plurality of sub-carriers and a set of allocated symbols of the plurality of symbols, and performance (by the transceiving circuitry) of communication based on the transmission allocation.

Depending on the circumstances (e.g. as exemplified in connection to step 402 of FIG. 4 and step 502 of FIG. 5), the acquiring circuitry may comprise one or more of the transceiving circuitry 710 (for receiving the indication from the WCD), estimating circuitry (for estimating the receiver DC frequency as a center frequency of the WCD bandwidth), and bandwidth registering circuitry (from which the receiver DC frequency may be retrieved).

The scheduler is for allocating transmission resources for the upcoming communications and the determining circuitry 702 may be comprised in, or otherwise associated with, the scheduler according to some embodiments.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node.

Embodiments may appear within an electronic apparatus (such as a network node) comprising arrangements, circuitry, and/or logic according to any of the embodiments described herein. Alternatively or additionally, an electronic apparatus (such as a network node) may be configured to perform methods according to any of the embodiments described herein.

Figure 8:
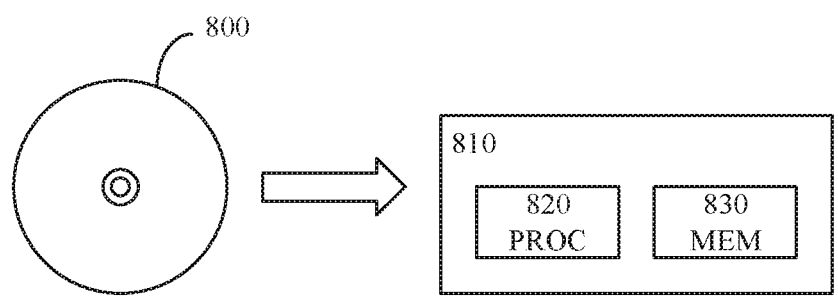
FIG. 8 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 8 illustrates an example computer readable medium in the form of a compact disc (CD) ROM 800. The computer readable medium has stored thereon a computer program comprising program instructions. The computer program is loadable into a data processor (PROC) 820, which may, for example, be comprised in a network node 810. When loaded into the data processing unit, the computer program may be stored in a memory (MEM) 830 associated with or comprised in the data-processing unit. According to some embodiments, the computer program may, when loaded into and run by the data processing unit, cause execution of method steps according to, for example, any of the methods illustrated in FIGS. 2-5.

Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means intended as limiting. On the contrary, these partitions are merely examples. Functional blocks described herein as one unit may be split into two or more units. Furthermore, functional blocks described herein as being implemented as two or more units may be merged into fewer (e.g. a single) unit.

Hence, it should be understood that the details of the described embodiments are merely examples brought forward for illustrative purposes, and that all variations that fall within the scope of the claims are intended to be embraced therein.

The invention claimed is:

1. A transmission allocation method for a network node of a wireless communication system configured to communicate using an Orthogonal Frequency Division Multiplexing, OFDM, signal comprising a plurality of sub-carriers in a frequency domain and a plurality of symbols in a time domain, wherein the network node is associated with a network node bandwidth comprising a network node direct current, DC, sub-carrier, and wherein the network node is configured to communicate with a wireless communication device, WCD, associated with a WCD bandwidth comprising a WCD DC sub-carrier which is different from the network node DC sub-carrier, each DC sub-carrier being one of the plurality of sub-carriers, the method comprising, for an upcoming communication between the network node and the WCD, in sequence order:

acquiring, in relation to the upcoming communication, an indication of a DC frequency of the network node or the WCD, the DC frequency comprising at least a receiver DC frequency, wherein the receiver DC frequency corresponds to the WCD DC sub-carrier when the upcoming communication is a downlink communication, and the receiver DC frequency corresponds to the network node DC sub-carrier when the upcoming communication is an uplink communication;

determining, based on the DC frequency, a transmission allocation for the upcoming communication, the transmission allocation comprising a set of transmission resources and a transmission configuration, and the set of transmission resources comprising a set of allocated sub-carriers of the plurality of sub-carriers and a set of allocated symbols of the plurality of symbols, wherein determining the transmission allocation comprises determining a ratio between a number of transmission resources at the receiver DC frequency and a total number of transmission resources of the set; and performing communication based on the transmission allocation.

2. The method of claim 1 wherein determining the transmission allocation based on the receiver DC frequency comprises:

determining the ratio is 0, such that the set of transmission resources is non-overlapping with the receiver DC frequency, and the transmission configuration has a default modulation and coding scheme and a default estimated performance metric; or determining the ratio is larger than 0 and no larger than 1, such that the set of transmission resources is overlapping with the receiver DC frequency and one or more of:

depleting transmission resources at the receiver DC frequency, wherein the ratio is 1;

determining the ratio between 0 and a ratio threshold and the transmission configuration has a first modulation and coding scheme and a first estimated performance metric; and determining the ratio between the ratio threshold and 1, and the transmission configuration has a second modulation and coding scheme and a second estimated performance metric.

3. The method of claim 2 wherein the first, second and default modulation and coding schemes and the first, second and default estimated performance metrics are compliant with at least one of:

the second modulation and coding scheme being more robust than the first modulation and coding scheme;

a second performance margin associated with the second estimated performance metric being larger than a first performance margin associated with the first estimated performance metric;

the second modulation and coding scheme being more robust than the default modulation and coding scheme;

the second performance margin associated with the second estimated performance metric being larger than a default performance margin associated with the first estimated performance metric;

the first modulation and coding scheme being more robust than the default modulation and coding scheme; and the first performance margin associated with the first estimated performance metric being larger than the default performance margin associated with the first estimated performance metric.

4. The method of claim 1 wherein the upcoming communication is the downlink communication, and wherein the receiver DC frequency corresponds to the WCD DC sub-carrier.

5. The method of claim 4 wherein acquiring the indication of the receiver DC frequency in relation to the upcoming communication comprises one or more of:

receiving the indication from the WCD; and determining the indication by estimating the receiver DC frequency as a center frequency of the WCD bandwidth.

6. The method of claim 4 wherein performing communication based on the transmission allocation comprises transmitting the OFDM signal of the upcoming communication according to the transmission allocation.

7. The method of claim 1 wherein the upcoming communication is the uplink communication, and wherein the receiver DC frequency corresponds to the network node DC sub-carrier.

8. The method of claim 7 wherein acquiring the indication of the receiver DC frequency in relation to the upcoming communication comprises retrieving the receiver DC frequency from bandwidth registering circuitry of the network node.

9. The method of claim 7 wherein performing communication based on the transmission allocation comprises transmitting a scheduling grant for the upcoming communication, the scheduling grant being indicative of the transmission allocation.

10. The method of claim 7 further comprising receiving the OFDM signal of the upcoming communication from the WCD, the OFDM signal being transmitted by the WCD according to the transmission allocation.

11. The method of claim 10 wherein a first part of the OFDM signal is received in transmission resources at the receiver DC frequency and a second part of the OFDM signal is received in other transmission resources, the method further comprising applying less weight to the first part of the OFDM signal than to the second part of the OFDM signal.

12. The method of claim 1 wherein the transmission configuration comprises a modulation and coding scheme, a transmission power, a code rate, or a transmission rank.

13. The method of claim 1 wherein the DC frequency further comprises a transmitter DC frequency.

14. A non-transitory computer readable medium, having thereon a computer program comprising program instructions, the computer program being loadable into a data processing unit of a network node of a wireless communication system configured to communicate using an Orthogonal Frequency Division Multiplexing, OFDM, signal comprising a plurality of sub-carriers in a frequency domain and a plurality of symbols in a time domain, the computer program and configured to, when executed by the data processing unit, cause the network node to:

wherein the network node is associated with a network node bandwidth comprising a network node direct current, DC, sub-carrier, and wherein the network node is configured to communicate with a wireless communication device, WCD, associated with a WCD bandwidth comprising a WCD DC sub-carrier which is different from the network node DC sub-carrier, each DC sub-carrier being one of the plurality of sub-carriers, for an upcoming communication between the network node and the WCD, in sequence order:

acquire, in relation to the upcoming communication, an indication of a DC frequency of the network node or the WCD, the DC frequency comprising at least a receiver DC frequency, wherein the receiver DC frequency corresponds to the WCD DC sub-carrier when the upcoming communication is a downlink communication, and the receiver DC frequency corresponds to the network node DC sub-carrier when the upcoming communication is an uplink communication;

determine, based on the DC frequency, a transmission allocation for the upcoming communication, the transmission allocation comprising a set of transmission resources and a transmission configuration, and the set of transmission resources comprising a set of allocated sub-carriers of the plurality of sub-carriers and a set of allocated symbols of the plurality of symbols, wherein determining the transmission allocation comprises determining a ratio between a number of transmission resources at the receiver DC frequency and a total number of transmission resources of the set; and perform communication based on the transmission allocation.

15. A transmission allocation arrangement for a network node of a wireless communication system configured to communicate using an Orthogonal Frequency Division Multiplexing, OFDM, signal comprising a plurality of sub-carriers in a frequency domain and a plurality of symbols in a time domain,
  wherein the network node is associated with a network node bandwidth comprising a network node direct current, DC, sub-carrier, and wherein the network node is configured to communicate with a wireless communication device, WCD, associated with a WCD bandwidth comprising a WCD DC sub-carrier which is different from the network node DC sub-carrier, each DC sub-carrier being one of the plurality of sub-carriers,
  the arrangement comprising a controller configured to cause, for an upcoming communication between the network node and the WCD, in sequence order:
    acquisition, in relation to the upcoming communication, of an indication of a DC frequency of the network node or the WCD, the DC frequency comprising at least a receiver DC frequency, wherein the receiver DC frequency corresponds to the WCD DC sub-carrier when the upcoming communication is a downlink communication, and the receiver DC frequency corresponds to the network node DC sub-carrier when the upcoming communication is an uplink communication;
    determination, based on the DC frequency, of a transmission allocation for the upcoming communication, the transmission allocation comprising a set of transmission resources and a transmission configuration, and the set of transmission resources comprising a set of allocated sub-carriers of the plurality of sub-carriers and a set of allocated symbols of the plurality of symbols, wherein determination of the transmission allocation comprises determination of a ratio between a number of transmission resources at the receiver DC frequency and a total number of transmission resources of the set; and
    performance of communication based on the transmission allocation.

16. The arrangement of claim 15 wherein the controller is configured to cause determination of the transmission allocation based on the receiver DC frequency by causing:
  determination of the ratio is 0, such that the set of transmission resources is non-overlapping with the receiver DC frequency, and the transmission configuration has a default modulation and coding scheme and a default estimated performance metric; or
  determination of the ratio is larger than 0 and no larger than 1, such that the set of transmission resources is overlapping with the receiver DC frequency and one or more of:
    depletion of transmission resources at the receiver DC frequency, wherein the ratio is 1;
    determination of the ratio between 0 and a ratio threshold and the transmission configuration has a first modulation and coding scheme and a first estimated performance metric; and
    determination of the ratio between the ratio threshold and 1, and the transmission configuration has a second modulation and coding scheme and a second estimated performance metric.

17. The arrangement of claim 15 wherein the upcoming communication is the downlink communication, and wherein the receiver DC frequency corresponds to the WCD DC sub-carrier.

18. The arrangement of claim 17 wherein the controller is configured to cause performance of communication based on the transmission allocation by causing transmission of the OFDM signal of the upcoming communication according to the transmission allocation.

19. The arrangement of claim 15 wherein the controller is configured to cause acquisition of the indication of the receiver DC frequency in relation to the upcoming communication by causing one or more of:
  reception of the indication from the WCD; and
  determination of the indication by estimation of the receiver DC frequency as a center frequency of the WCD bandwidth.

20. The arrangement of claim 15 wherein the upcoming communication is the uplink communication, and wherein the receiver DC frequency corresponds to the network node DC sub-carrier.

21. The arrangement of claim 20 wherein the controller is configured to cause acquisition of the indication of the receiver DC frequency in relation to the upcoming communication by causing retrieving of the receiver DC frequency from band width registering circuitry of the network node.

22. The arrangement of claim 20 wherein the controller is configured to cause performance of communication based on the transmission allocation by causing transmission of a scheduling grant for the upcoming communication, the scheduling grant being indicative of the transmission allocation.

23. The arrangement of claim 20 wherein the controller is further configured to cause reception of the OFDM signal of the upcoming communication from the WCD, the OFDM signal being transmitted by the WCD according to the transmission allocation.

24. The arrangement of claim 23 wherein a first part of the OFDM signal is received in transmission resources at the receiver DC frequency and a second part of the OFDM signal is received in other transmission resources, the controller being further configured to cause application of less weight to the first part of the OFDM signal than to the second part of the OFDM signal.

25. A network node comprising the arrangement of claim 15.

26. The arrangement of claim 15 wherein the transmission configuration comprises a modulation and coding scheme, a transmission power, a code rate, or a transmission rank.

* * * * *